United States Patent
Duarte Da Cal et al.

(10) Patent No.: US 12,534,261 B2
(45) Date of Patent: Jan. 27, 2026

(54) BOTTLE WITH AN ENHANCED BOTTOM

(71) Applicant: SOCIETE ANONYME DES EAUX MINERALES D'EVIAN ET EN ABRÉGÉ "S.A.E.M.E", Evian-les-Bains (FR)

(72) Inventors: Germano Duarte Da Cal, Thonon-les-Bains (FR); Yann Debuire, Allinges (FR); Rémi Charlot, Neuvecelle (FR); Frédéric Senaux, Evian-les-Bains (FR); Eric Viollaz, Evian-les-Bains (FR)

(73) Assignee: SOCIETE ANONYME DES EAUX MINERALES D'EVIAN ET EN ABRÉGÉ "S.A.E.M.E", Evian-les-Bains (FR)

( * ) Notice: Subject to any disclaimer, the term of this patent is extended or adjusted under 35 U.S.C. 154(b) by 22 days.

(21) Appl. No.: 18/279,420

(22) PCT Filed: Mar. 1, 2022

(86) PCT No.: PCT/FR2022/050359
§ 371 (c)(1),
(2) Date: Aug. 30, 2023

(87) PCT Pub. No.: WO2022/185003
PCT Pub. Date: Sep. 9, 2022

(65) Prior Publication Data
US 2024/0190605 A1    Jun. 13, 2024

(30) Foreign Application Priority Data
Mar. 2, 2021 (FR) ...................................... 2102028

(51) Int. Cl.
*B65D 1/02* (2006.01)
*B29C 49/48* (2006.01)
(Continued)

(52) U.S. Cl.
CPC ............ *B65D 1/0284* (2013.01); *B29C 49/48* (2013.01); *B29C 49/06* (2013.01); *B29C 49/4823* (2013.01);
(Continued)

(58) Field of Classification Search
CPC ................ B65D 5/5085; B65D 1/0284; B65D 2501/0036; B65D 1/44; B29C 49/48;
(Continued)

(56) References Cited

U.S. PATENT DOCUMENTS 5,989,661 A    11/1999  Krishnakumar et al.
6,112,925 A *   9/2000  Nahill .................. B65D 1/0215
                                                                   215/381
(Continued)

FOREIGN PATENT DOCUMENTS

AR            074574       1/2011
EP        0 140 792 A2     5/1985
(Continued)

*Primary Examiner* — Kareen K Thomas
(74) *Attorney, Agent, or Firm* — Bauer & Joseph

(57) ABSTRACT

A bottle having good mechanical properties and lightness due to its bottom design includes a bottom, a body, and a neck. The bottom has a dome, a coronal arch, an annular seat, a side wall, six main radial grooves, five secondary radial grooves situated between the main grooves, each having an end Ev in the arch, and a peripheral end Ep in the side wall. The bottom is such that the ratio Mf/Vuf, wherein Mf is the weight of the bottom and Vuf is the useful volume of the bottom, is less than or equal to 0.050 g/mL and the ratio $Ø^{do}/H^{do}$, wherein $Ø^{do}$ is the diameter of the dome at its base and $H^{do}$ is its apex height along an axis Z, is greater than or equal to 4.4. The invention also relates to a manufacturing method and a mold for the bottle.

9 Claims, 12 Drawing Sheets

(51) Int. Cl.
  *B29C 49/06* (2006.01)
  *B29C 49/64* (2006.01)
  *B29K 67/00* (2006.01)
  *B29L 31/00* (2006.01)
(52) U.S. Cl.
  CPC ............... *B29C 2049/4848* (2013.01); *B29C 2049/4892* (2013.01); *B29C 49/6418* (2013.01); *B29C 49/6445* (2013.01); *B29K 2067/003* (2013.01); *B29L 2031/7158* (2013.01); *B65D 2501/0036* (2013.01)
(58) Field of Classification Search
  CPC . B29C 49/06; B29C 49/4823; B29C 49/6418; B29C 49/6445; B29C 2049/4848; B29C 2049/4892; B29K 2067/003; B29L 2031/7158
  See application file for complete search history.

(56) References Cited

U.S. PATENT DOCUMENTS

| | | | | |
|---|---|---|---|---|
| 11,845,581 | B2* | 12/2023 | Hanan | ................... B65D 1/0223 |
| 2010/0140280 | A1* | 6/2010 | Burke | ..................... B29C 49/62 |
| | | | | 220/660 |
| 2011/0285063 | A1* | 11/2011 | Chauvin | ................. B29C 49/46 |
| | | | | 264/525 |
| 2014/0197127 | A1* | 7/2014 | Lane | ..................... B65D 1/0261 |
| | | | | 425/526 |
| 2015/0129537 | A1* | 5/2015 | Mast | ..................... B65D 1/0223 |
| | | | | 215/382 |
| 2015/0151869 | A1* | 6/2015 | Dominguez | ......... B65D 1/0276 |
| | | | | 425/522 |
| 2015/0321826 | A1* | 11/2015 | Bouffand | ............ B29C 49/0871 |
| | | | | 425/522 |
| 2015/0336320 | A1* | 11/2015 | Poulat | ................. B29C 49/4823 |
| | | | | 425/526 |
| 2018/0162579 | A1 | 6/2018 | Kado et al. | |

FOREIGN PATENT DOCUMENTS

| | | |
|---|---|---|
| EP | 0 140 792 A3 | 5/1985 |
| EP | 2 735 517 | 5/2014 |
| WO | 2013/178905 | 12/2013 |
| WO | 2018/228921 | 12/2018 |
| WO | 2018/228962 | 12/2018 |

\* cited by examiner

Section C-C

Detail H

BOTTLE WITH AN ENHANCED BOTTOM

FIELD OF THE INVENTION

The invention relates to the field of bottles made of thermoplastic material such as polyethylene terephthalate (PET) manufactured by blow molding or stretch blow molding a preform itself obtained by molding the thermoplastic material, for example by injection stretch blow molding (ISBM).

These bottles are in particular intended to contain drinks, for example water or other drinks. The bottles of the invention may in particular be intended to contain non-gaseous drinks, for example still water.

The invention also has for object the blow molding mold enabling these bottles to be obtained.

TECHNOLOGICAL BACKGROUND OF THE INVENTION

The manufacture of a PET bottle consists in blow molding a preform obtained by molding PET, for example by injection or compression molding, consisting of a tube closed at one end and the opening of which is defined by a neck intended to be that of the finished bottle. This preform is placed in a mold the imprint of which corresponds to the body and to the bottom of the bottle. The preform is heated to a temperature above the glass transition temperature of PET. Compressed air is blown into the softened preform so that it expands and comes to be pressed against the walls of the mold, perfectly espousing the relief of the imprint of the mold. Blow molding may be complemented by stretching carried out by means of a sliding rod.

The rigidity and the mechanical strength of the finished bottle are essentially determined by its shape, its structure, its thicknesses, and by the PET hardened to a more or less crystalline state. The body comprises, from top to bottom, along its vertical axis Z in the position with the bottle in an upright position on a flat support: a neck, a body and a bottom. This body and this bottom may be marked off by different grooves/ribs/steps, in accordance with diverse and varied patterns, intended to confer on it an aesthetic shape and mechanical properties required after filling, in particular impact resistance, sufficient rigidity and satisfactory strength in the upright position. Plastic drinking water bottles are stored in packets of a plurality of units shrink-wrapped in plastic film. For storage and transport these packets are stacked, in particular on pallets. It is then vital for the filled bottles to withstand the mechanical loads imposed by such storage and transport solutions. Any deformation, stoving in, deterioration of the filled bottles are defects limiting sales and/or degrading the user experience.

The mechanical strength properties of a plastic bottle filled with water stored on pallets by stacking a plurality of layers of packets of bottles shrink-wrapped in plastic film are determined in particular by the bottom of the bottle and more precisely by the raised and recessed patterns that it includes and the mass of thermoplastic material constituting it.

Another factor taken under consideration by the designers and manufacturers of plastic bottles intended to contain (still) drinking water relates to the quantity of plastic material used. It is desirable as much for economic as for ecological reasons to reduce the quantity of plastic material used, and therefore to seek to reduce the thickness of the various parts of the bottles.

Another factor taken under consideration by the designers and manufacturers of plastic bottles intended to contain (still) drinking water relates to the manufacturing conditions. It is in particular desirable for obvious reasons of energy saving and thus in fine protection of the environment to reduce as much as possible the blow molding pressure, which is for example between 25 and 30 bar inclusive for 150 cL capacity bottles, using a standard injection blow molding technology, that is to say with no vents around the injection point.

The patent application WO 2013/178905 describes a plastic container having a body and a bottom extending from the lower end of the body, the bottom comprising a peripheral seat defining a placement plane, a concave arch that extends from a central zone as far as the seat, and a series of reinforcement junctions extending radially from the central zone at least as far as the seat. The arch has two concentric regions, namely a central region and a peripheral region, separated by an axial step that extends circumferentially and continuously around the central zone so that the central region is raised relative to the peripheral region. This step would constitute a means of stabilizing the container, in particular under conditions of extreme pressure and/or volume. This plastic bottle having a specific bottom is open to improvement in terms of mechanical and weight properties.

OBJECTIVES OF THE INVENTION

In this context, the invention aims to satisfy at least one of the objectives stated hereinafter.

One objective of the invention is to provide a bottle made of thermoplastic material such as PET that achieves an optimum trade-off between mechanical properties and lightness, in particular thanks to its bottom.

Another objective of the invention is to provide a bottle made of thermoplastic material such as PET the mechanical properties of which evaluated in a palletization test, in particular where the capability of the bottles to remain upright is concerned, are notably enhanced relative to existing properties while minimizing the weight of the bottle.

Another objective of the invention is to provide a bottle made of thermoplastic material such as PET achieving an optimum trade-off between mechanical properties and lightness and adapted to be blow molded under usual conditions of heating the preform and blow molding pressure, using a standard injection blow molding technology (with no vents around the injection point), even at lower blow molding pressures, for identical temperatures to which the preform is heated.

Another objective of the invention is to provide a bottle made of thermoplastic material such as PET resistant to uncontrolled deformation, in particular to overturning or angular offset, and in particular if the internal pressure is high. This angular offset is a phenomenon whereby, when the container is placed on a plane surface, the axis of the container pivots relative to a vertical axis (because of the low weight of the container) and the container performs a movement of rotation about the theoretical vertical axis, straightening its axis, until it is immobilized of its own accord, when its axis is positioned on the theoretical vertical axis.

Another objective of the invention is to provide a bottle made of thermoplastic material such as PET that benefits from good stability when it is filled and stored on pallets.

Another objective of the invention is to provide a bottle made of thermoplastic material such as PET that is economic, not greedy of energy and as eco-compatible as possible, in particular with regard to its manufacture.

Another objective of the invention is to provide an injection blow molding mold enabling production of the bottle in line with the above objectives.

Another objective of the invention is to provide a high-performance method of manufacturing by injection blow molding a bottle in line with the above objectives.

BRIEF DESCRIPTION OF THE INVENTION

The invention satisfies at least one of the above objectives and in a first aspect concerns a bottle made of thermoplastic polymer, preferably of polyethylene terephthalate (PET), obtained by injection blow molding an injection-molded preform, comprising from bottom to top along a vertical axis Z of the bottle resting upright on a horizontal plane support in a contact plane XY a bottom, a body and a neck, the spatial frame of reference of this bottle being an orthonormal system of axes [XYZ] with origin O,
  the bottom comprising successively and in a centrifugal direction:
  a dome with axis Z extending toward the interior of the bottle and preferably having a mark of injection molding of the preform located in the region of the apex of the dome,
  a coronal arch extending toward the interior of the bottle,
  an annular seat intended to be in contact with the plane support in a contact plane XY on which the bottle is able to rest in upright position,
  a lateral wall extending in a non-horizontal direction as far as the body at a height H of 15 mm with a height h0 situated at the level of the plane of the seat, that is to say the plane that coincides with the contact plane XY of the plane support on which the bottle can rest in an upright position, the junction between the lateral wall and the annular seat constituting an annular edge,
  at least three, preferably between four and eight, preferably equiangular main grooves extending radially from the dome to the lateral wall, defining arch portions between them on the arch,
  at least three, preferably between four and eight, preferably equiangular, secondary grooves disposed between the main grooves, preferably equidistant angularly from the main grooves, each extending radially between an end Ev in an arch portion and a peripheral end Ep in the lateral wall, characterized in that:
  the ratio Mf/Vuf
  in which Mf is the weight of the bottom and Vuf the usable volume of the bottom,
  is less than or equal to 0.050 g/mL, preferably less than or equal to 0.045 g/mL, more preferably less than or equal to 0.035 g/mL,
  the ratio d/D
  in which d is the radial distance between the axis Z and the end Ev of at least one of the secondary grooves and D is the radial distance between the axis Z and the annular edge is greater than or equal to 0.65, preferably greater than or equal to 0.70,
  the ratio $\varnothing^{do}/H^{do}$
  in which $\varnothing^{do}$ is the diameter of the dome at its base and $H^{do}$ its apex height along the axis Z or an axis parallel to Z,
  is greater than or equal to 4.4, preferably 4.8.

These ratios Mf/Vuf, d/D, $\varnothing^{do}/H^{do}$ are the expression of a judiciously designed arrangement of the shape and of the grooving of the bottom of the bottle, a consequence of which is, from the mechanical point of view, an optimum distribution of the thermoplastic material in the bottom of the bottle. This arrangement also improves the circulation of the molten plastic material in the mold during manufacture.

This leads to a particularly high-performance response of this bottle in a pallet test, described hereinafter, consisting in stacking on a pallet a plurality of layers of packets of bottles filled with water and shrink-wrapped in plastic film. The bottle according to the invention therefore has a level of quality corresponding to a low percentage of defects caused by the constraints of palletization compared to the prior art negative reference.

The bottle according to the invention is moreover singular in that it has at least one of the features stated hereinafter in paragraphs 22 to 44.

In accordance with one feature the thickness of the bottom decreases continuously in the radial direction along a radial generatrix line G extending, outside zones comprising the main grooves and secondary grooves, from the axis Z to the annular edge.

This radial generatrix is for example G2 along the cutting line (C-C) shown in FIG. 7.

The thickness e is preferably greater than or equal to 1200 μm at the level of the dome.

The thickness e is preferably equal to or less than or equal to 150 μm at the level of the annular edge.

The thickness e is preferably:
  greater than or equal to 1200 μm at the level of the dome, and
  less than or equal to 150 μm at the level of the annular edge.

The bottle is preferably such that the thickness of the bottom decreases continuously in the radial direction along three generatrices G1, G2 et G3 extending from the center of the dome toward the periphery of the bottom distributed in equiangular manner on arch portions excluding any groove. The thicknesses are measured at different radial distances increasing on each generatrix from the center to the periphery.

G1, G2 and G3 are therefore defined as shown in FIG. 7 and with reference to the orthonormal system of axes [XYZ] the origin of which is the point O:
  G1: radial direction along the axis X, between the axis Z and the lateral wall of the bottom;
  G2: radial direction at an angle of 120° relative to G1 in the clockwise rotation direction between the axis Z and the lateral wall of the bottom;
  G3: radial direction at an angle of 240° relative to G1 in the clockwise rotation direction between the axis Z and the lateral wall of the bottom.

Accordingly, in one embodiment, for abscissae G(x) relative to the axis Z, with G corresponding to G1, G2 or G3, between 5 millimeters and the distance to the annular edge, inclusive, for example from approximately 5 mm to approximately 25 mm inclusive for a bottle of small volume (for example less than or equal to 50 cL), or 5 mm to approximately 35 mm inclusive for a bottle of large volume (for example less than or equal to 150 cL), the thickness e of the bottom wall (2) can therefore vary:
  for x=5 mm; 1200 μm≤e≤1600 μm, preferably 1300 μm≤e≤1500 μm;
  for x=10 mm; 200 μm≤e≤600 μm, preferably 300 μm≤e≤500 μm;
  for x=15 mm; 100 μm≤e≤300 μm, preferably 150 μm≤e≤250 μm;
  for x=20 mm; 80 μm≤e≤280 μm, preferably 100 μm≤e≤220 μm;

for x=25 mm; 30 µm≤e≤150 µm, preferably 60 µm≤e≤120 µm;
for x=30 mm; 30 µm≤e≤150 µm, preferably 60 µm≤e≤120 µm;
for x=35 mm; 30 µm≤e≤150 µm, preferably 60 µm≤e≤120 µm.

In a variant of this embodiment, for abscissae G(x) relative to the axis Z, with G corresponding to a mean of the values of e over G1, G2 and G3, inclusive, between 5 millimeters and the distance of the annular edge, for example 5 mm to approximately 25 mm inclusive for a bottle of small volume (for example 50 cL), or 5 mm to approximately 35 mm for a bottle of large volume (for example 150 cL), the thickness e of the bottom wall (2) can therefore vary:
for x=5 mm; 1200 µm≤e≤1600 µm, preferably 1300 µm≤e≤1500 µm;
for x=10 mm; 200 µm≤e≤600 µm, preferably 300 µm≤e≤500 µm;
for x=15 mm; 100 µm≤e≤300 µm, preferably 150 µm≤e≤250 µm;
for x=20 mm; 80 µm≤e≤280 µm, preferably 100 µm≤e≤220 µm;
for x=25 mm; 30 µm≤e≤150 µm, preferably 60 µm≤e≤120 µm;
for x=30 mm; 30 µm≤e≤150 µm, preferably 60 µm≤e≤120 µm;
for x=35 mm; 30 µm≤e≤150 µm, preferably 60 µm≤e≤120 µm.

In another embodiment, for abscissae G(x) relative to the axis Z with G corresponding to G1, G2 or G3 between 5 millimeters and the distance of the annular edge inclusive, for example 5 mm to approximately 25 mm inclusive, the thickness e of the bottom wall (2) can therefore vary:
for x=5 mm; 1200 µm≤e≤1600 µm, preferably 1300 µm≤e≤1500 µm;
for x=10 mm; 200 µm≤e≤600 µm, preferably 300 µm≤e≤500 µm;
for x=15 mm; 100 µm≤e≤300 µm, preferably 150 µm≤e≤250 µm;
for x=20 mm; 80 µm≤e≤280 µm, preferably 100 µm≤e≤220 µm;
for x=25 mm; 30 µm≤e≤150 µm, preferably 60 µm≤e≤120 µm.

In a variant of this embodiment, for abscissae G(x) relative to the axis Z, with G corresponding to a mean of the values of e over G1, G2 and G3 between 5 millimetres and the distance of the annular edge (15), for example 5 mm to approximately 25 mm inclusive, the thickness e of the bottom wall (2) can therefore vary:
for x=5 mm; 1200 µm≤e≤1600 µm, preferably 1300 µm≤e≤1500 µm;
for x=10 mm; 200 µm≤e≤600 µm, preferably 300 µm≤e≤500 µm;
for x=15 mm; 100 µm≤e≤300 µm, preferably 150 µm≤e≤250 µm;
for x=20 mm; 80 µm≤e≤280 µm, preferably 100 µm≤e≤220 µm;
for x=25 mm; 30 µm≤e≤150 µm, preferably 60 µm≤e≤120 µm.

The bottom in accordance with the invention advantageously offers good axial distribution of the material. The standard deviation, for the same abscissa G(x) along the three generatrices, is smaller. The mean standard deviation over the part of the bottom extending from the axis Z to the annular edge is therefore preferably less than or equal to 35 µm.

In accordance with another feature the bottle is such that the ratio d/D in which d is the radial distance between the axis Z and the end Ev of at least one of the secondary grooves and D is the radial distance between the axis Z and the annular edge, is greater than or equal to 0.65, preferably greater than or equal to 0.70.

In accordance with another feature at least one of the main grooves has an inverted "U" general shape in cross section in a plane parallel to the axis Z, and the branches of the "U" form between them an angle $\alpha 1$ between 30 and 50° inclusive, preferably between 45 and 55° inclusive.

In accordance with another feature least one of the secondary grooves in the bottom of the bottle has an inverted "V" general shape in cross section in a plane parallel to the axis Z,
and the branches of the "V" form between them an angle $\alpha 2$ between 45 and 65° inclusive, preferably between 50 and 60° inclusive.

In accordance with another feature each arch portion of the coronal arch of the bottom of the bottle has a substantially rectilinear radial profile.

In accordance with another feature each arch portion has a profile forming an angle $\alpha 3$ with the contact plane XY between 5 and 20° inclusive, preferably between 10 and 15° inclusive.

In accordance with a preferred embodiment in at least one of its bottom, body and neck parts the bottle has a circular shape in cross section in a plane parallel to the contact plane XY.

In accordance with another embodiment the neck of the bottle has a non-circular (for example oval or rectangular, in particular square) shape in cross section on a plane parallel to the contact plane XY.

In accordance with another feature the bottle has a volume in centiliters: from 20 to 30 cL, or from 30 to 40 cL, or from 40 to 60 cL, or from 60 to 80 cL, or from 80 to 110 cL, or from 110 to 130 cL, or from 130 to 160 cL, or from 160 to 180 cL, or from 180 to 220 cL, or from 220 to 260 cL, preferably 25 cL, or 33 cL, or 50 cL, or 75 cL, or 100 cL, or 125 cL, or 150 cL, or 175 cL, or 200 cL.

In accordance with another feature each main groove has one end Ev in the arch and a peripheral end Ep in the lateral wall. Moreover, the end Ev of some or all of the main grooves is open and opens under the dome and/or the end Ep of some or all of the main grooves is open and opens toward the exterior of the bottle.

In accordance with another feature the end Ep of some or all of the secondary grooves is open and opens toward the exterior of the bottle, preferably short of the end Ep of at least one of the adjacent main grooves.

In accordance with another feature the end Ev of some or all of the secondary grooves is open and opens under the arch.

In accordance with another feature the end Ev of some or all of the secondary grooves has a pointed profile, the point forming an angle $\alpha 4$ less than or equal to 30°, preferably less than or equal to 20°.

In accordance with a second of its aspects the invention concerns a blow molding mold one part of which has an imprint enabling the bottom of the bottle according to the invention to be obtained.

In accordance with a third of its aspects the invention relates to a method of manufacturing the bottle according to the invention consisting in employing a preform preferably obtained by injection molding employing a blow molding, possibly stretch blow molding, technology using the mold according to the invention.

BRIEF DESCRIPTION OF THE DRAWINGS

This description is given with reference to the appended figures depicting non-limiting embodiments in which.

The reference numbers used in all the figures designate the same elements.

Definitions

Conforming to the terminology used in the present text, the following non-limiting definitions are given by way of example and illustration for the interpretation of the present text:

any singular designates a plural and vice versa,

"thermoplastic" refers to a thermoplastic or moldable copolymer or homopolymer that becomes fluid, viscous, pliable, moldable above a specific temperature (for example the glass transition temperature) and returns to the solid/hardened state after cooling.

DETAILED DESCRIPTION OF THE INVENTION

The container at the heart of the invention is a bottle 1 made of thermoplastic polymer material, preferably of polyethylene terephthalate (PET).

Figure 3:
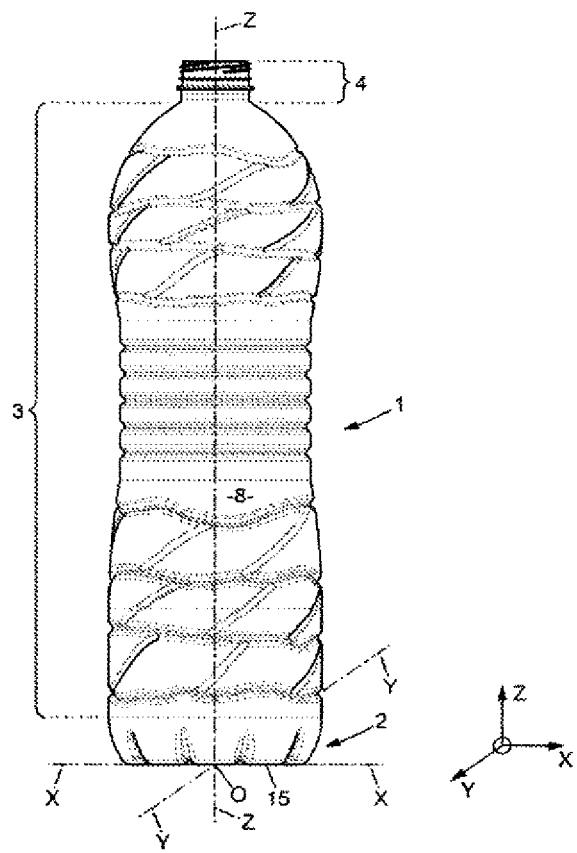
FIG. 3 is a front view of one embodiment of a bottle according to the invention.
Figure 4:
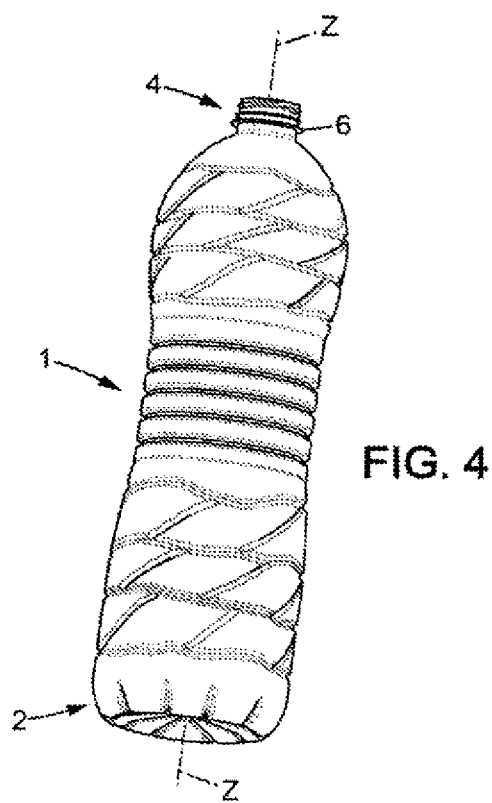
FIG. 4 is a perspective view of another embodiment of a bottle according to the invention.

This bottle 1 represented in FIGS. 3 and 4 is described hereinafter with reference to a three-dimensional orthonormal system of axes [XYZ] with origin O. The axis Z-Z or Z is the axis of the bottle 1. The axes X-X or X and Y-Y or Y define a plane XY which is the contact plane between the bottom of the bottle and a plane horizontal support on which the bottle rests when upright. The origin O of the orthonormal system of axes XYZ is in this plane XY. FIGS. 3, 5, 6 and 9 in particular show this spatial system of axes XYZ.

The bottle 1 comprises from top to bottom along the axis Z a bottom 2, a body 3 and a neck 4 delimiting the upper opening 5 of the bottle 1 and separated from the body 3 by a flange 6 surmounted by a thread 7 intended to cooperate with a screw cap to close the bottle 1. The body 3 of the bottle 1 comprises groove and rib patterns known in themselves with no references in the figures and intended to contribute to the mechanical strength of the body 3.

In the following description the terms "interior", "internal" "toward the interior" refer to an element close to or in the direction of the axis Z of the bottle 1 or in the enclosure 8 defined by the bottom 2, the body 3 and the neck 4, forming an envelope delimiting this enclosure 8 of the bottle 1, and the terms "exterior", "external", "toward the exterior" relate to an element situated in an opposite direction along the axis Z of the bottle 1 or outside the enclosure 8 of the bottle 1. The terms "low", "lower", "high", "upper" are to be understood as relative to the bottle 1 placed on a plane horizontal support XY when upright.

This bottle 1 is produced industrially by the technology of injection blow molding a preform sufficiently heated to be fluid in a mold having the imprint of the bottle. Blow molding may be complemented by stretching by means of an axial rod introduced into the preform (injection stretch blow molding (ISBM)).

Figure 1:
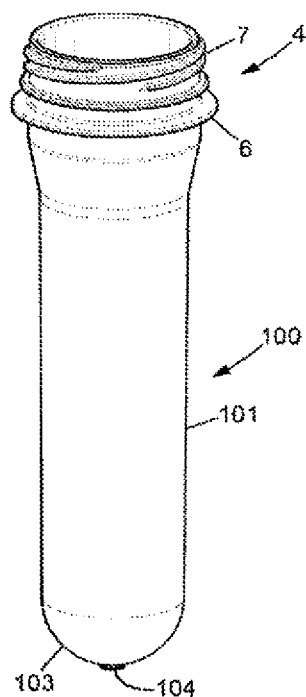
FIG. 1 is a perspective view of a preform intended for the manufacture of the bottle according to the invention by blow molding.
Figure 2:
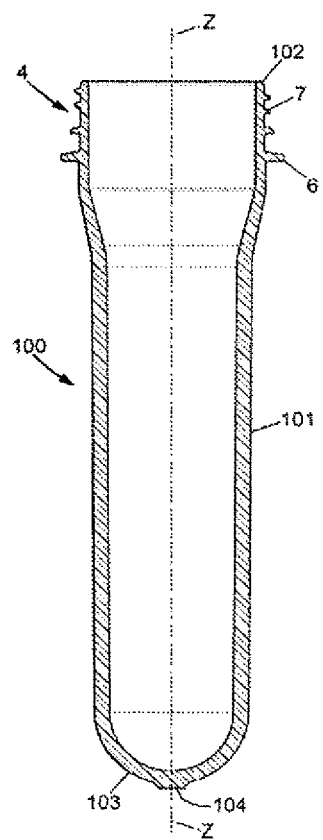
FIG. 2 is a view in section of FIG. 1 in the median diametral plane of the preform shown in FIG. 1.

FIGS. 1 and 2 show an example of this preform 100 in the form a tube with axis Z defined by a wall 101, open at its upper end 102 and including the neck 4 of the future bottle 1 and the bottom 103 of which has a hemispherical general shape. When this preform is manufactured by injection molding the lower end of the bottom 103 includes on the exterior face of the wall 101 a protrusion 104 extending outward along the axis Z. This is a mark left by the injection point of the preform 100.

In a compression molding production variant the preform has no such mark.

As shown in FIGS. 5, 6, 7, 9, 10 and 11 the bottom 2 of this bottle 1 successively and centrifugally comprises:

a dome 9, a coronal arch 12 extending toward the interior of the bottle 1 (enclosure 8), an annular seat 13 intended to be in contact with the plane support in a contact plane XY on which the bottle 1 may rest when upright, a lateral wall 14 extending in a non-horizontal direction (different from XY) as far as the body, at a height H of 15 mm with a height h0 situated at the level of the plane of the seat 13 that coincides with the contact plane XY of the plane support on which the bottle 1 may rest when upright.

Figure 10:
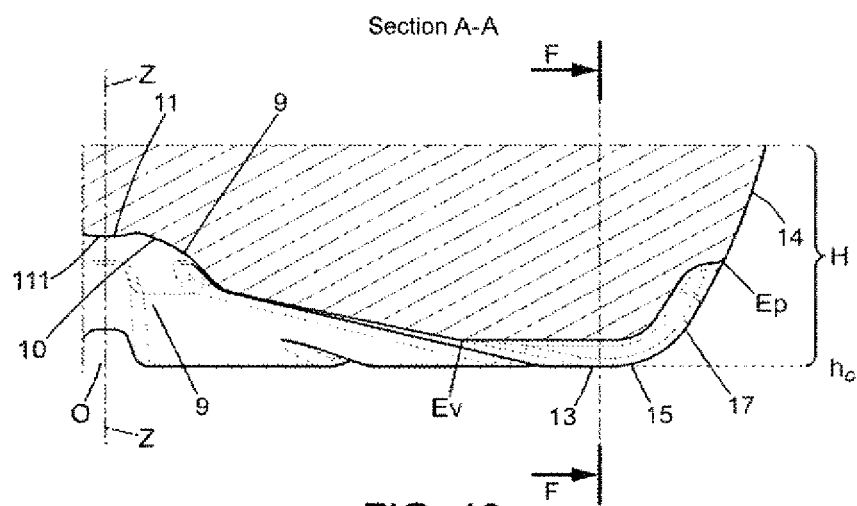
FIG. 10 is a view in section taken along the line A-A in FIG. 7.
Figure 11:
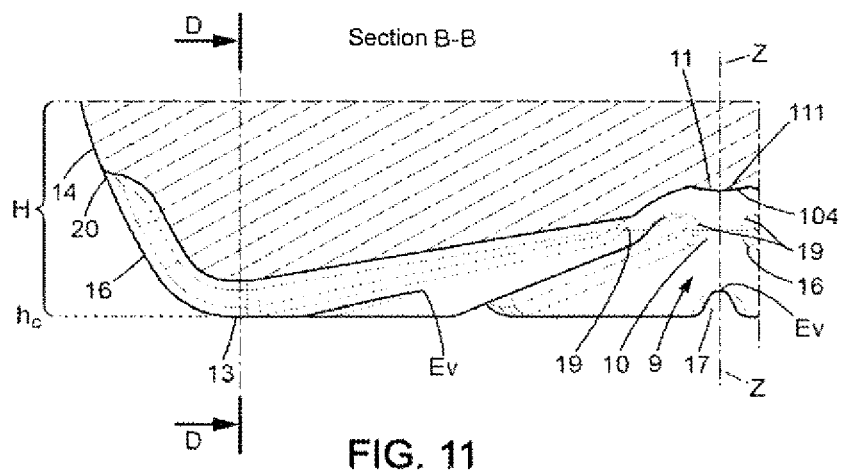
FIG. 11 is a view in section taken along the line B-B in FIG. 7.
Figure 12:
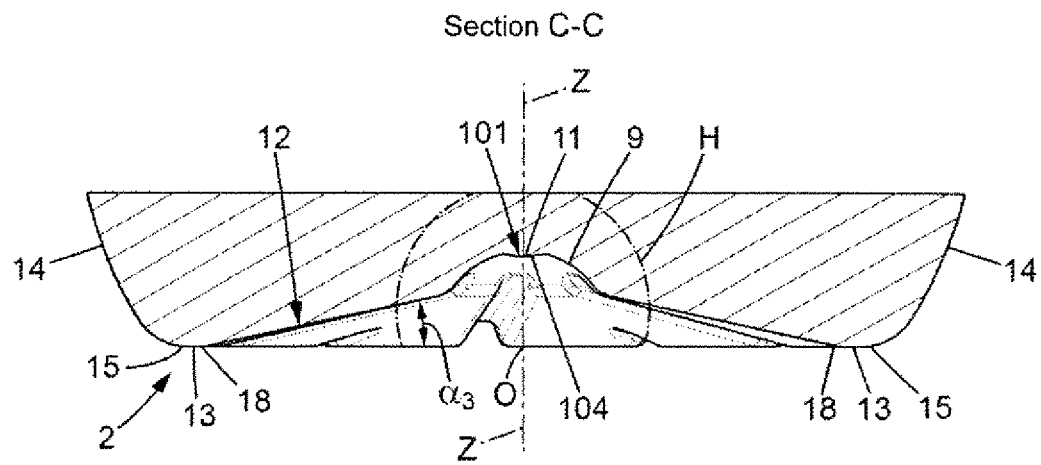
FIG. 12 is a view in section taken along the line C-C in FIG. 7.
Figure 13:
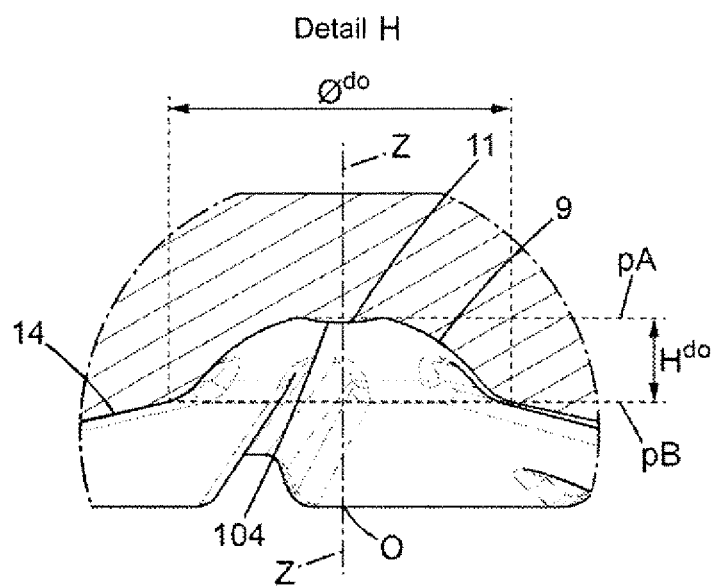
FIG. 13 is a view of the detail H in FIG. 12.

As appears in particular in FIGS. 10 and 11 the junction between the lateral wall 14 and the annular seat 13 constitute an annular edge 15 that forms a sort of line of demarcation between these two parts of the bottom 2.

FIGS. 5, 6, 7 and 9 show that the lower face of the bottom 2 is marked by radial mechanical reinforcement grooves of two types: main grooves 16 and secondary grooves 17.

Figure 7:
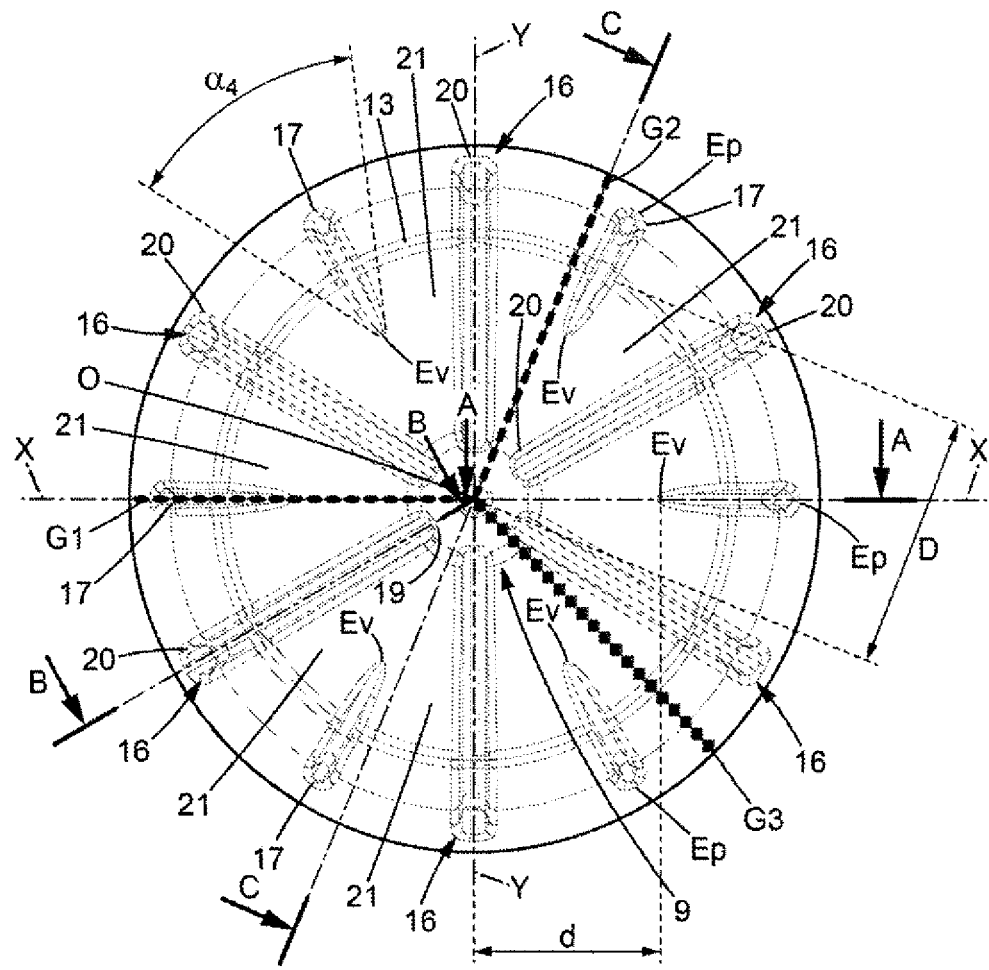
FIG. 7 is a view from below and from in front of the bottom of the bottle from FIG. 4.

The bottom 2 is represented in FIGS. 5 to 14 as a cup as if detached from the rest of the bottle 1. This virtual cup, considered in isolation, contributes to the definition of the bottle according to the invention. To this end three generatrices G1, G2, G3 are defined as shown in FIG. 7:

G1: radial direction along the axis X, between the axis Z and the lateral wall of the bottom 2;

G2: radial direction at an angle of 120° relative to G1 in the clockwise rotation direction, between the axis Z and the lateral wall of the bottom 2;

G3: radial direction at an angle of 240° relative to G1 in the clockwise rotation direction, between the axis Z and the lateral wall of the bottom 2.

Apart from its shape and its height H=15 mm described hereinabove, the bottom 2 may equally be defined by its weight Mf and by a usable volume Vuf. Mf is measured by weighing the bottom when dry and Vuf by filling it with water up to a level such that the meniscus is concave, the edge of that meniscus being contained in the plane perpendicular to Z corresponding to the upper edge of the lateral wall 14 of the bottom 2.

In accordance with the invention, outside the zones comprising the main grooves 16 and the secondary grooves 17, the thickness of the bottom 2 decreases continuously in the radial direction from the axis Z (dome 9) at least as far as the annular edge 15, to the exclusion of the zones comprising the main and secondary grooves, that is to say for example along the control lines 16 shown in FIG. 7.

In one embodiment, for abscissae G(x) relative to the axis Z, with G corresponding to G1, G2 or G3, between 5 and 35 millimeters inclusive, the thickness e of the wall of the bottom 2 may therefore vary:

for x=5 mm; 1200 µm≤e≤1600 µm, preferably 1300 µm≤e≤1500 µm;

for x=10 mm; 200 µm≤e≤600 µm, preferably 300 µm≤e≤500 µm;

for x=15 mm; 100 µm≤e≤300 µm, preferably 150 µm≤e≤250 µm;

for x=20 mm; 80 µm≤e≤280 µm, preferably 100 µm≤e≤220 µm;

for x=25 mm; 30 µm≤e≤150 µm, preferably 60 µm≤e≤120 µm;

for x=30 mm; 30 µm≤e≤150 µm, preferably 60 µm≤e≤120 µm;

for x=35 mm; 30 µm≤e≤150 µm, preferably 60 µm≤e≤120 µm.

In a variant of this embodiment, for abscissae G(x) relative to the axis Z, with G corresponding to a mean of the values of e over G1, G2 and G3, between 5 and 35 millimeters inclusive, the thickness e of the wall of the bottom 2 may vary:

for x=5 mm; 1200 µm≤e≤1600 µm, preferably 1300 µm≤e≤1500 µm;

for x=10 mm; 200 µm≤e≤600 µm, preferably 300 µm≤e≤500 µm;

for x=15 mm; 100 µm≤e≤300 µm, preferably 150 µm≤e≤250 µm;

for x=20 mm; 80 µm≤e≤280 µm, preferably 100 µm≤e≤220 µm;

for x=25 mm; 30 µm≤e≤150 µm, preferably 60 µm≤e≤120 µm;

for x=30 mm; 30 µm≤e≤150 µm, preferably 60 µm≤e≤120 µm;

for x=35 mm; 30 µm≤e≤150 µm, preferably 60 µm≤e≤120 µm. In another embodiment for abscissae G(x) relative to the axis Z, with G corresponding to G1, G2 or G3, between 5 and 35 millimeters inclusive, the thickness e of the wall of the bottom 2 may vary:

for x=5 mm; 1200 µm≤e≤1600 µm, preferably 1300 µm≤e≤1500 µm;

for x=10 mm; 200 µm≤e≤600 µm, preferably 300 µm≤e≤500 µm;

for x=15 mm; 100 µm≤e≤300 µm, preferably 150 µm≤e≤250 µm;

for x=20 mm; 80 µm≤e≤280 µm, preferably 100 µm≤e≤220 µm;

for x=25 mm; 30 µm≤e≤150 µm, preferably 60 µm≤e≤120 µm. In a variant of this embodiment, for abscissae G(x) relative to the axis Z, with G corresponding to a mean of the values of e over G1, G2 and G3, between 5 and 35 millimeters inclusive, the thickness e of the wall of the bottom 2 may vary:

for x=5 mm; 1200 µm≤e≤1600 µm, preferably 1300 µm≤e≤1500 µm;

for x=10 mm; 200 µm≤e≤600 µm, preferably 300 µm≤e≤500 µm;

for x=15 mm; 100 µm≤e≤300 µm, preferably 150 µm≤e≤250 µm;

for x=20 mm; 80 µm≤e≤280 µm, preferably 100 µm≤e≤220 µm;

for x=25 mm; 30 µm≤e≤150 µm, preferably 60 µm≤e≤120 µm.

The dome 9 with axis Z extends toward the interior (enclosure 8) of the bottle 1. The region of the apex 11 of the dome 9 includes a convex well 111 with axis Z. The injection mark 104 on the preform 100 corresponds to the well 111 as seen from outside the bottom 2. The well 111 may correspond to a point of injection of the preform.

The region of the apex 11 is defined by the peripheral edge of the well 111 in the plane $P^A$ perpendicular to Z. In accordance with a variant in which the region of the apex 11 of the dome 9 is not a well 111 but an apex point 11. The plane $P^A$ orthogonal to Z comprises only the apex point 11.

In accordance with the invention the dome 9 preferably extends between the plane $P^A$ and its base which is inscribed in a plane $P^B$ parallel to $P^A$ comprising the circle corresponding to an inflexion (that is to say a break of curvature) between the coronal arch 12 and the dome 9. Throughout its thickness the coronal arch 12 is advantageously rectilinear as seen in section on the vertical plane containing the axis Z.

Figure 14:
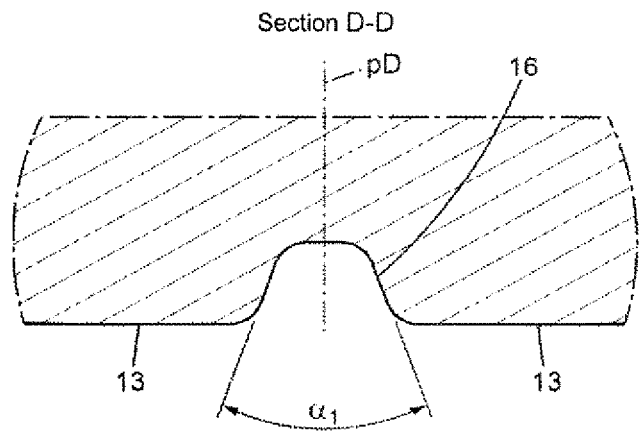
FIG. 14 is a view in section taken along the line D-D in FIG. 7.

The distance between the plane $P^A$ and the plane $P^B$ corresponds to the height $H^{do}$ of the dome 9 (FIG. 14).

The diameter of the circle defining the base of the dome 9 is designated by the reference $\varnothing^{do}$.

The ratio $\emptyset^{do}/H^{do}$ is one of the noteworthy features of the invention. Preferably greater than or equal to 4.5, it is for example between 4.6 and 10 inclusive, or better still between 4.6 and 8 inclusive.

The coronal arch (coronal in the sense that it forms a ring between the dome and the seat) 12 connects the base of the dome 9 to the annular edge 18 of the annular seat 13. Like the dome 9, this coronal arch 10 is a thin part of the bottom 2 that projects in the centripetal direction toward the interior of the bottle 1 (enclosure 8). The thickness of this arch 12 for example increases slightly from the dome 9 toward the annular seat. Its interior face 12i as seen in vertical section on the axis Z (section CC of FIG. 7 shown in FIG. 13) is preferably rectilinear but could alternatively be curvilinear or indeed corrugated. In a preferred embodiment with a rectilinear radial profile this interior face 12i of the arch 12 forms an angle $\alpha 3$ with the contact plane XY that may for example be of the order of 12°.

The annular seat 13 delimited by the annular edge 18 and the peripheral annular edge 15 is intended to be the zone of contact with the plane support on which the bottle 1 may rest when upright. It is part of the plane XY. Its thickness from the edge 18 to the edge 15 advantageously decreases, or is even constant.

The annular edge 15 forms an inflexion limit from which the lateral wall 14 rises from h0 in the plane XY to H equal to 15 mm at the level of the plane perpendicular to Z corresponding to the upper edge of this lateral wall 14 of the bottom 2. In accordance with a remarkable feature of the invention the thickness of this lateral wall 14 continues to decrease from the annular edge 15 as far as the upper edge at H=15 mm. In accordance with a variant, this thickness may be substantially constant.

Figure 5:
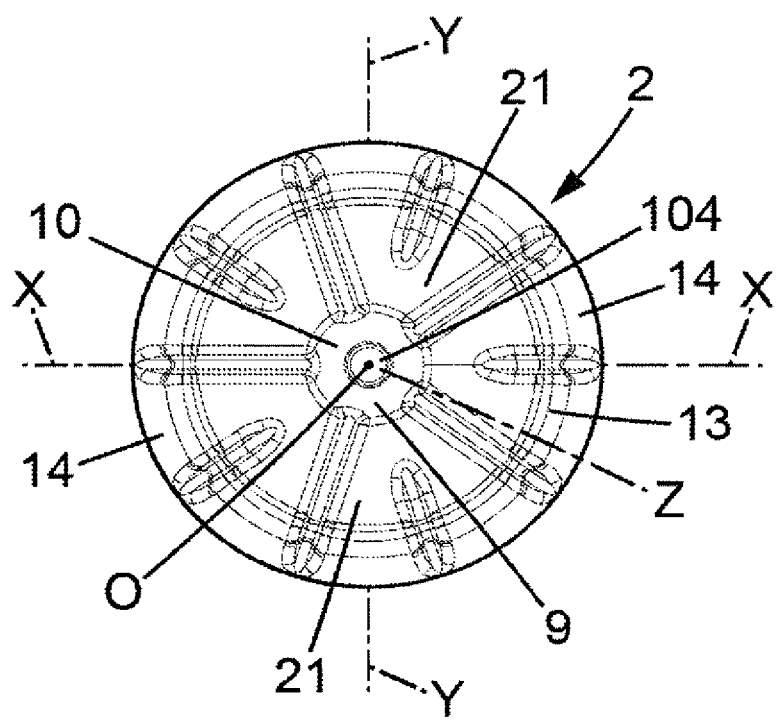
FIG. 5 is a view from below and from the front of the bottom of the bottle from FIG. 3.
Figure 6:
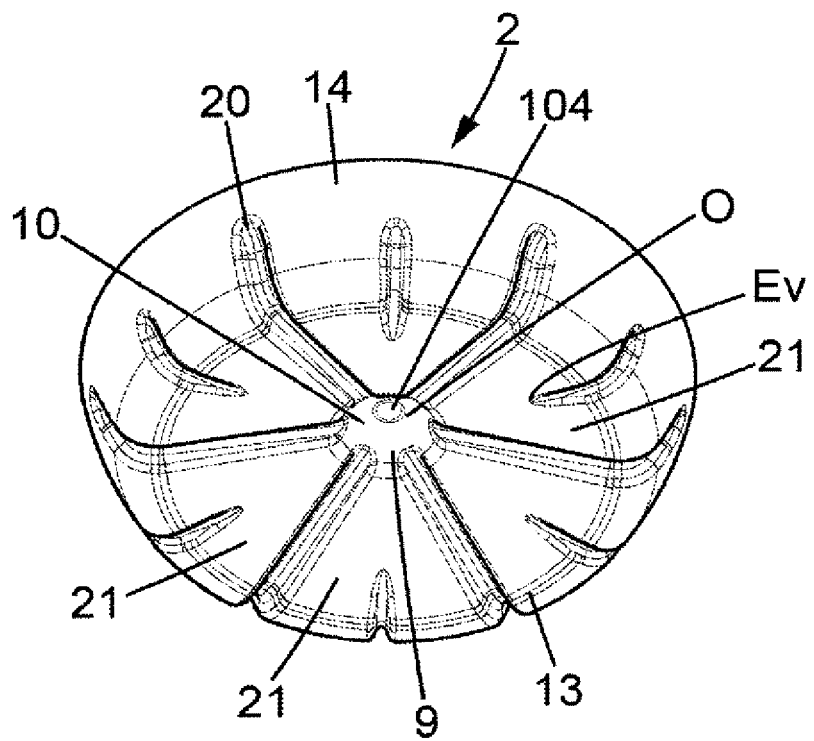
FIG. 6 is a perspective view from below of the bottom of the bottle from FIG. 4.

There are five main grooves 16 in the embodiment from FIG. 5 and six in the embodiment from FIGS. 6 to 14. These main grooves 16 extend radially from the dome 9 as far as the lateral wall 14. They are separated from one another by the same angular offset of 72° for the FIG. 5 embodiment and 60° for the embodiment from FIGS. 6 to 14. As can be seen more particularly in FIGS. 5, 6, 7 and 9, the radial main ribs 16 each have a central open end 19 recessed in the dome 9 and a peripheral open end 20 located on the lateral wall 14.

Figure 15:
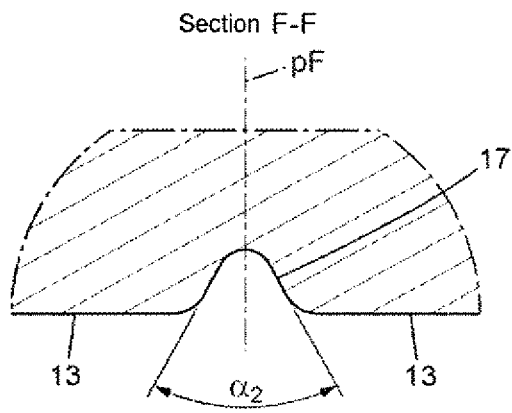
FIG. 15 is a view in section taken along the line F-F in FIG. 7.

FIG. 15 shows the inverted "U" general shape of the cross section of each main groove 16 and the angle $\alpha 1$ defined by the lateral faces of the groove 16 on respective opposite sides of the median diametral plane PD (branches of the "U"). The angle $\alpha 1$ is for example equal to 40° plus or minus 5°.

The radial main grooves 16 cross all of the coronal arch 12 and therefore delimit similar arch portions 21.

The secondary radial grooves 17 are disposed between the main radial grooves 16. In the example shown in the figures the secondary radial grooves 17 have the same angles between them and each is separated from the two adjacent radial main grooves 16 by the same angle. There are five secondary radial grooves 17 in the embodiment shown in FIG. 5 and six in the embodiment appearing in FIGS. 6, 7, 9.

Each secondary radial grooves 17 has an open end Ev situated in an arch portion 21 and a peripheral open end Ep imprinted in the lateral wall 14.

As shown in FIG. 7 each end Ev is separated from the axis Z by a distance d that is another of the noteworthy parameters of the invention. Each secondary radial groove 17 is therefore able to contribute to the stiffening and to the mechanical reinforcement of the bottom 2 of the bottle 1 without impeding the circulation of the molten plastic material during injection blow molding. In accordance with the invention this distance d between Ev and Z is defined in a relative manner relative to the distance D that is the radial distance between the axis Z and the annular edge 15 (FIG. 7).

Figure 8:
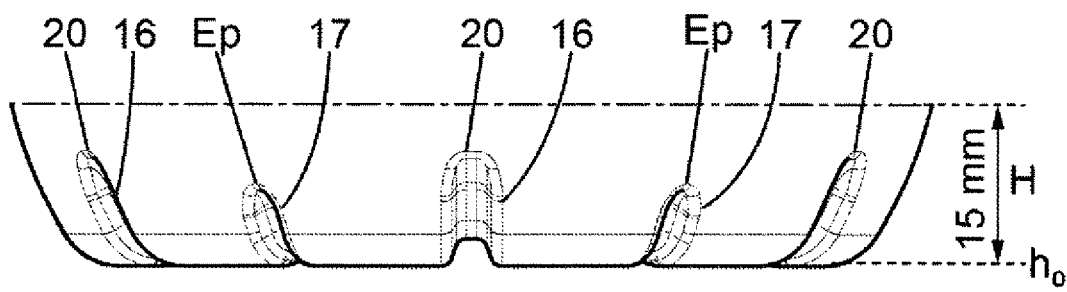
FIG. 8 is a side view of FIG. 7.
Figure 9:
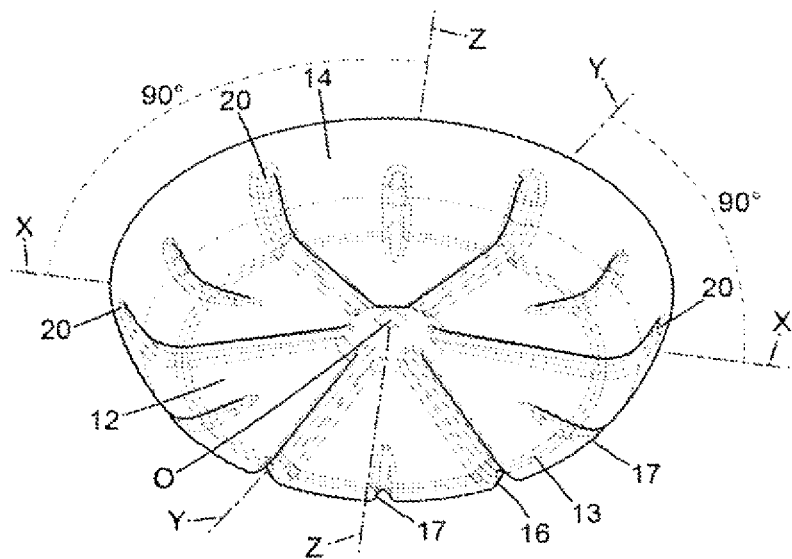
FIG. 9 is a perspective view of the bottom from FIGS. 7 and 8.

The ratio d/D is therefore advantageously greater than or equal to 0.65, preferably 0.65, for example between 0.70 and 1.0 inclusive, and better still between 0.71 and 0.80 inclusive. FIGS. 8, 10 and 11 show that the peripheral open ends Ev of the secondary radial grooves 17 are located at a height lower than that of the open peripheral ends 20 of the main radial grooves 16.

FIG. 15 shows the "V" general shape of the cross section of each secondary groove 17 and the angle $\alpha 2$ defined by the lateral faces of the groove 17 on respective opposite sides of the median diametral plane $P^F$ (branches of the "V"). The angle $\alpha 2$ is for example equal to 55° plus or minus 5°.

In accordance with one particular feature of the invention each secondary radial groove 17 has a profiled shape the point of which is the end Ev at a distance d from the axis Z. The angle $\alpha 4$ defined by this profiled shape is advantageously between 20° and 60° inclusive, preferably between 30° and 20° inclusive. This value is consistent with seeking optimum circulation of molten plastic material during shaping of the bottle by injection blow molding, to obtain in fine a distribution of thermoplastic material matched to the target objectives of lightness and mechanical strength.

The embodiments shown in the figures correspond to a circular shape of the bottle in cross section on a plane parallel to the contact plane XY. The invention also encompasses any non-circular bottle shape. Consequently, the qualifiers relating to the circular shape: "radial", "annular", "diameter", etc. would be transposed to the description of a bottle in accordance with the invention of non-circular shape in cross section.

EXAMPLES

The following examples illustrate the performance of bottles in accordance with the invention in terms of a mechanical properties/lightness trade-off in a palletization test.

The bottles used in these examples are shown in the appended FIGS. 16 to 27.

Examples 1 and 2 (Comparative)—150 cL Bottles 150 cL PET bottles are manufactured by injection moulding a preform and then blow moulding. The blow moulding is effected by heating preforms using lamps distributed along the preforms and then by introduction into moulds, followed by stretching and blow moulding in the moulds.

The molds consist of two half-molds for the body of the bottles and a mold bottom for the bottoms of the bottles.

The weight of PET in the bottom is adjusted by varying the intensity of heating by the different lamps: an increase of heating at the level of the bottom of the preform enables the quantity of PET to be reduced at the level of the bottom of the bottle.

The bottles are analyzed by measurement (weight and volume of the bottom, distances, thickness measurements) and the bottles obtained are evaluated by a palletization test.

Also analyzed and evaluated are 150 cL bottles purchased commercially in France in early 2021, described as being the lightest on the French market.

The main characteristics of the manufactured or purchased bottles and the results of the analyses and tests are set out in table 1.

Analyses

Weight and volume of the bottom: the bottom of a bottle is cut off at a height of 15 mm. The weight and the usable volume are measured.

Profile of Thicknesses:

The thicknesses of the bottle are measured along three generatrices G1, G2 and G3 distributed equiangularly and extending from the center of the dome to the periphery of the bottom on arch portions excluding any groove (cf. § [0027] supra). The thicknesses are measured at different radial distances, increasing on each generatrix from the center toward the periphery. For each radial distance the mean thickness for the three generatrices and the standard deviation of the thicknesses for the three generatrices are noted. The thickness profiles are set out in table 2.

All the analyses are carried out on a sample of three bottles. The mean values are noted.

Palletization Test

The filled and capped bottles are grouped into shrink-wrapped packs of six bottles. The packs are disposed on 800 mm×1200 mm pallets in four superposed layers of 21 packs separated by a layer of cardboard. The pallets of bottles are wrapped in plastic film.

The pallets are subjected to simulation of transport by placing them on a vibrating table for four hours, before storage for ten days at 40° C. at 40% relative humidity.

216 bottles (43%) from each pallet are then examined. The following results are noted:

Critical instability defects: number of bottles that do not remain upright (for example with an inverted bottom).

Critical verticality defects: number of bottles that lean when upright, with a radial distance greater than 8 mm between the center of the cap and the center of the bottom.

Quality index: proportion of bottles having no defects or minor defects in respect of all of the following criteria: instability, collapsed shoulder, deformed body (buckling), verticality, ovalization, lateral flattenings of the body.

TABLE 1

Figure 16:
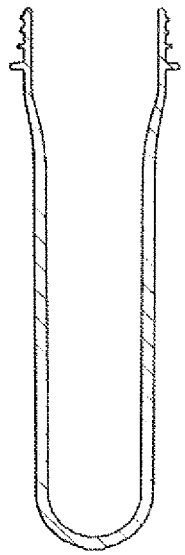
FIG. 16 is a view in diametral section of the preform used to manufacture a bottle according to the invention used in example 1.
Figure 17:
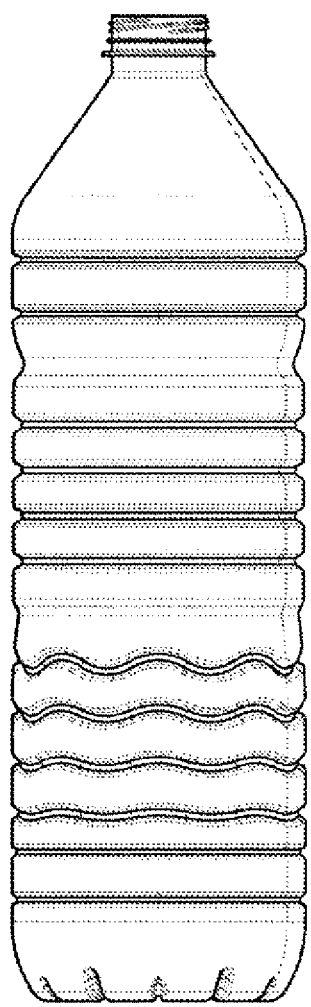
FIG. 17 is a lateral view of a bottle according to the invention used in example 1 produced from the FIG. 16 preform.
Figure 18:
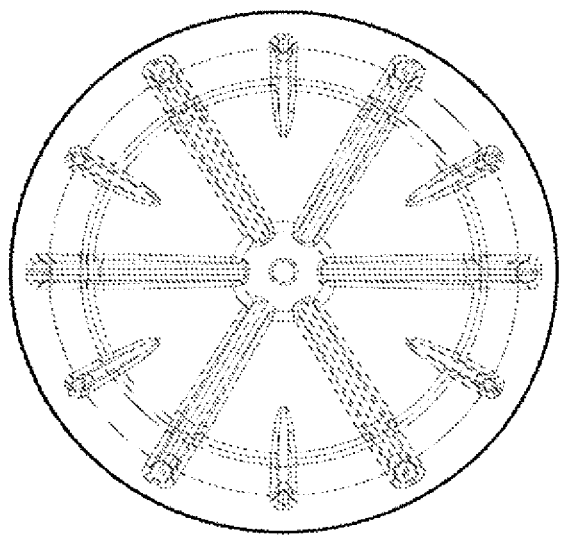
FIG. 18 is a view from below showing the bottom of the bottle represented in FIG. 17.
Figure 19:
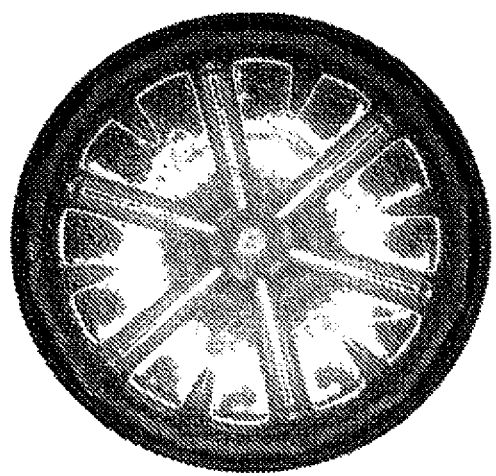
FIG. 19 is a photograph from below showing the bottom of the bottle represented in FIG. 17.

|  | Example 1 | Example 2 (comparative) |
|---|---|---|
| Source of the bottle | Manufactured | Purchased |
| Capacity of the bottle | 150 cL | 150 cL |
| Preform | FIG. 16 | NA |
| Weight of preform and bottle | 22 g | 20 g |
| Bottle and bottom | FIG. 17 | |
| Details of bottom | FIG. 18 | FIG. 19 |
| Weight of bottom | 2.30 g | 2.91 g |
| Measured weight of bottom | 67 mL | 66.5 mL |
| Mf/Vuf | 0.034 g/mL | 0.044 g/mL |
| d/D | 0.72 | 0.64 |
| $Ø^{do}/H^{do}$ | 6.9 | 2.55 |
| Critical instability defects (number of bottles) | 3 | 45 |
| Critical verticality defects (number of bottles) | 3 | 45 |
| Quality index (%) | 41.7 | 21.9 |

It is apparent that the bottom of the invention, for a lower weight, makes it possible to limit defects and to enhance quality after palletization.

TABLE 2

| | Example 1 | | Example 2 (Comparative) | |
|---|---|---|---|---|
| | Source of the bottle | | | |
| | Manufactured | | Purchased | |
| | Capacity of the bottle | | | |
| | 150 cL | | 150 cL | |
| Distance from center | Mean thickness | Standard deviation | Mean thickness | Standard deviation |
| 5 mm | 1419.00 | 100.434672 | 673.11 | 86.7193213 |
| 10 mm | 457.44 | 72.6128924 | 497.33 | 72.9257933 |
| 15 mm | 283.78 | 14.3982487 | 363.22 | 39.9279947 |
| 20 mm | 215.11 | 8.25917828 | 439.44 | 47.1170946 |
| 25 mm | 174.11 | 8.14817745 | 312.78 | 32.0689345 |
| 30 mm | 137.56 | 7.00034502 | 214.44 | 12.4185974 |
| 35 mm | 109.89 | 3.72537003 | 175.00 | 9.09806003 |
| Mean value from 0 to 25 mm | 509.89 | 40.7706338 | 457.18 | 55.7518277 |
| Mean value from 0 to 35 mm | 253.60 | 30.6541263 | 382.19 | 42.8965423 |
| Commentary | The bottom offers and features a regular distribution of the material well distributed over the perimeter of the bottle (low standard deviations) and with a decreasing only profile. The bottom offers and features reduced thicknesses at the periphery, conferring an increased capacity to return to shape after loading. | | The bottom offers and features an irregular distribution of the material badly distributed over the perimeter of the bottle (high standard deviations) and with an irregular profile (overthickness at 20 mm). The bottom offers and features large thicknesses at the periphery, conferring a reduced capacity to return to shape after loading. | |

Examples 3 and 4 (Comparative)—50 cL Bottles 50 cL PET bottles are manufactured in a similar manner.

The bottles are analyzed in a similar manner and the bottles obtained are evaluated by a palletization test of the same kind, adapted to suit the format of the bottles.

Also analyzed and evaluated are 50 cL bottles purchased commercially in France in 2021. The mark is identical for the 150 cL bottles and for the 50 cL bottles.

The main features of the bottles manufactured or purchased and the results of analyses and tests are set out in table 3. The thickness analyses are set out in table 4.

TABLE 3

Figure 20:
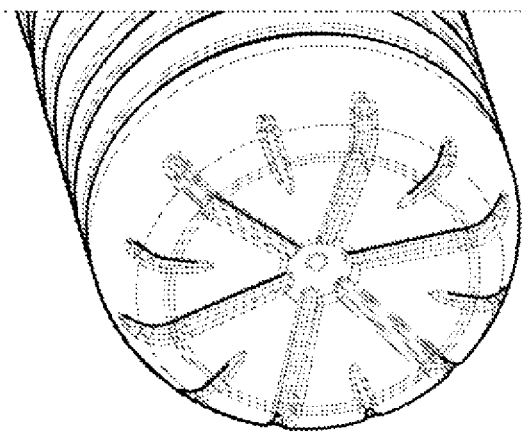
FIG. 20 is a partial perspective view from below showing the bottom of the bottle represented in FIG. 17.
Figure 21:
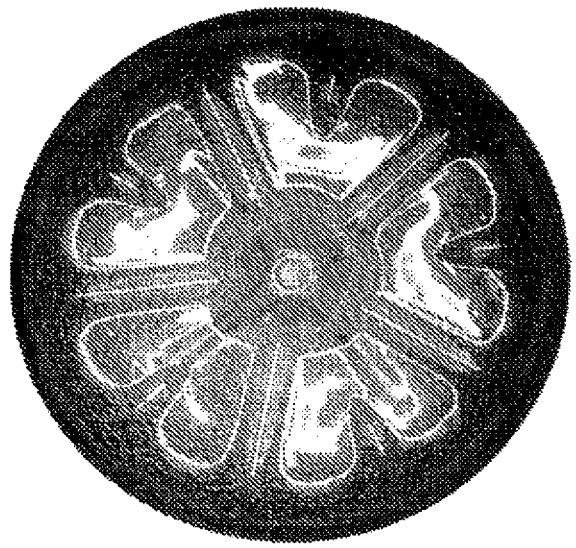
FIG. 21 is a photograph from below showing the bottom of the negative reference bottle used in comparative example 2.
Figure 22:
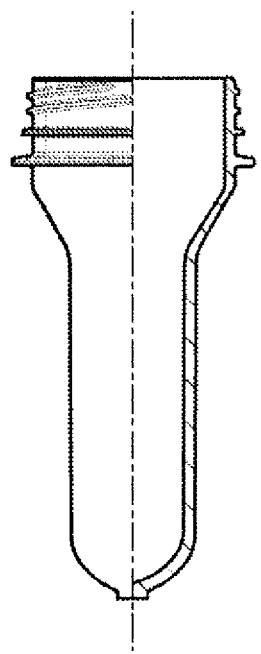
FIG. 22 is a partial lateral view in diametral section of the preform used to manufacture a bottle according to the invention used in example 3.
Figure 23:
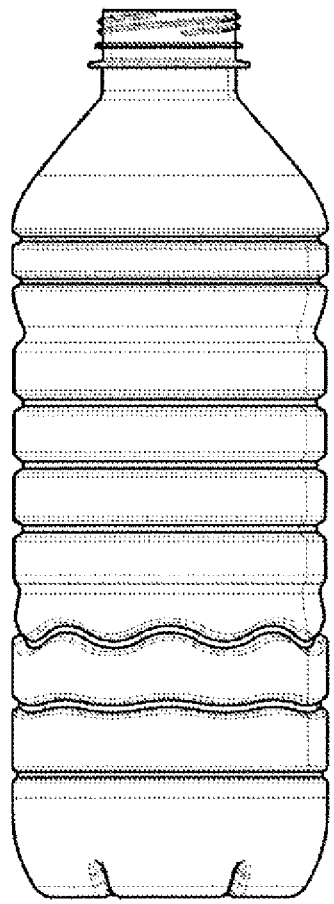
FIG. 23 is a lateral view of a bottle according to the invention used in example 3 produced from the FIG. 22 preform.
Figure 24:
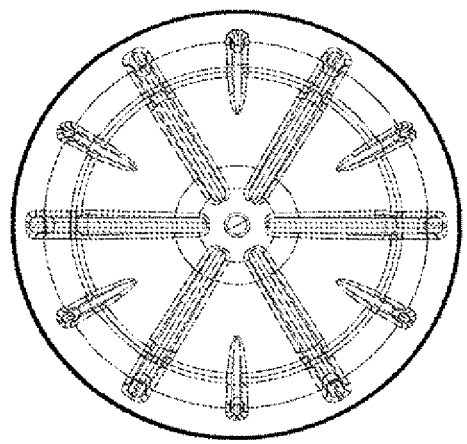
FIG. 24 is a view from below showing the bottom of the bottle represented in FIG. 23.
Figure 25:
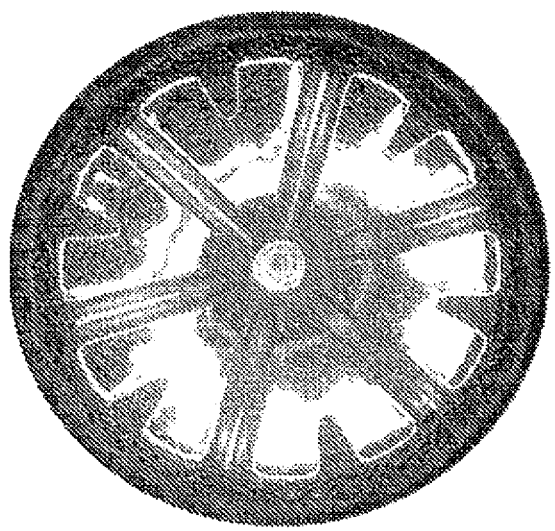
FIG. 25 is a photograph from below showing the bottom of the bottle represented in FIG. 23.
Figure 26:
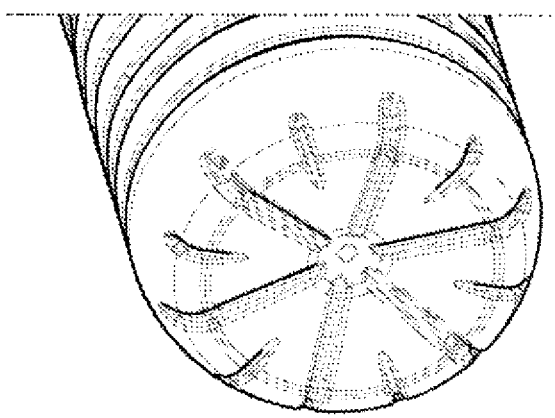
FIG. 26 is a partial perspective view from below showing the bottom of the bottle represented in FIG. 23.
Figure 27:
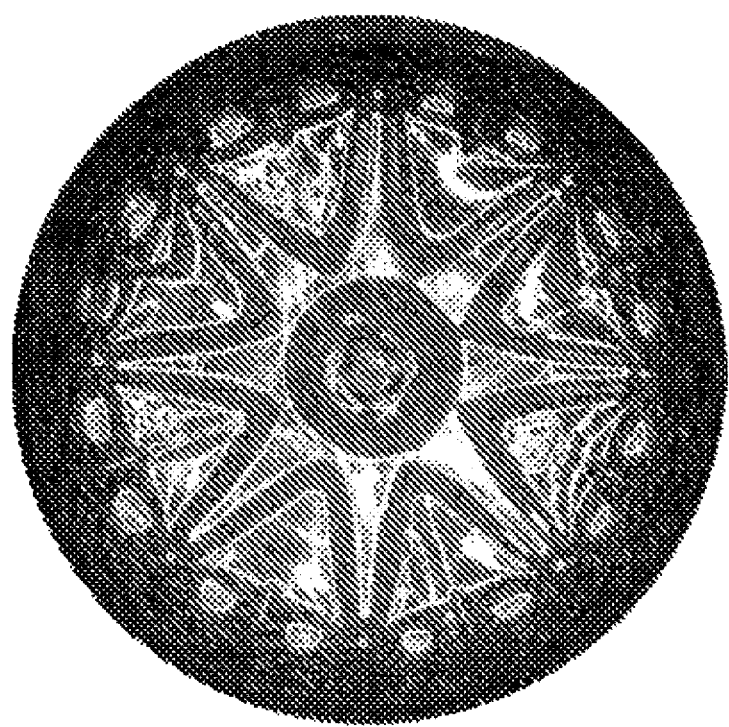
FIG. 27 is a photograph from below showing the bottom of the negative reference bottle used in comparative example 4.

|  | Example 3 | Example 4 (Comparative) |
|---|---|---|
| Source of the bottle | Manufactured | Purchased |
| Capacity of the bottle | 50 cL | 50 cL |
| Preform | FIG. 20 | NA |
| Weight of preform and bottle | 9 g | 9.2 g |
| Bottle and bottom | FIG. 21 | |
| Details of bottom | FIG. 22 | FIG. 23 |
| Weight of bottom | 1.10 g | 1.20 g |
| Measured weight of bottom | 37 mL | 39.5 mL |
| Mf/Vuf | 0.030 g/mL | 0.030 g/mL |
| d/D | 0.75 | 0.76 |
| $\varnothing^{do}/H^{do}$ | 4.85 | 4 |
| Critical instability defects (number of bottles) | 0 | 42 |
| Critical verticality defects (number of bottles) | 9 | 15 |
| Quality index (%) | 46.3 | 21.7 |

It is apparent that the bottom of the invention, for a lower weight, makes it possible to limit defects and to enhance quality after palletization.

TABLE 4

| | Example 3 | | Example 4 (Comparative) | |
|---|---|---|---|---|
| | Source of the bottle | | | |
| | Manufactured | | Purchased | |
| | Capacity of the bottle | | | |
| | 50 cL | | 50 cL | |
| Distance from center | Mean thickness | Standard deviation | Mean thickness | Standard deviation |
| 5 mm | 1385.78 | 72.0472671 | 455.00 | 197.463993 |
| 10 mm | 330.78 | 52.7609633 | 193.33 | 44.3148296 |
| 15 mm | 171.44 | 11.8804609 | 153.00 | 15.123696 |
| 20 mm | 110.33 | 4.48503793 | 153.00 | 15.3346189 |
| 25 mm | 72.22 | 5.39532657 | 122.78 | 8.66658654 |
| Mean value from 0 to 25 mm | 414.11 | 29.3138112 | 215.42 | 56.1807449 |
| Commentary | The bottom offers and features a regular distribution of the material well distributed over the perimeter of the bottle (low standard deviations) and with a decreasing only profile. The bottom offers and features reduced thicknesses at the periphery, conferring an increased capacity to return to shape after loading. | | The bottom offers and features an irregular distribution of the material badly distributed over the perimeter of the bottle (high standard deviations) and with a partially flat profile (same thicknesses at 15 and 20 mm. The bottom offers and features large thicknesses at the periphery, conferring a reduced capacity to return to shape after loading. | |

The invention claimed is:

1. A bottle made of thermoplastic polymer, having an interior obtained by blow molding an injection-molded preform, comprising from bottom to top along a vertical axis Z of the bottle resting upright on a horizontal plane support in a contact plane XY, a bottom, a body and a neck, a spatial frame of reference of this bottle being an orthonormal system of axes [XYZ] with origin O, the bottom comprising successively and in a centrifugal direction:
a dome with axis Z extending toward the interior of the bottle,
a coronal arch extending toward the interior of the bottle,
an annular seat intended to be in contact with a plane support in the contact plane XY on which the bottle is able to rest in an upright position,
a lateral wall extending in a non-horizontal direction as far as the body at a height H of 15 mm with reference to a height h0 situated at the plane support of the annular seat, a junction between the lateral wall and the annular seat constituting an annular edge,
at least three main grooves extending radially from the dome to the lateral wall, defining arch portions between them on the coronal arch,
at least three secondary grooves disposed between the main grooves, each extending radially between an end Ev in an arch portion and a peripheral end Ep in the lateral wall, wherein:
a ratio Mf/Vuf, in which Mf is the weight of the bottom and Vuf is a usable volume of the bottom, is less than or equal to 0.050 g/mL,
a ratio $\varnothing^{do}/H^{do}$, in which $\varnothing^{do}$ is the diameter of the dome at its base and $H^{do}$ is its apex height along the axis Z or an axis parallel to Z, is greater than or equal to 4.4.

2. The bottle as claimed in claim 1, wherein a thickness of the bottom decreases continuously in a radial direction along a radial generatrix line G extending, outside zones comprising the main grooves and secondary grooves, from the axis Z to the annular edge.

3. The bottle as claimed in claim 1, wherein a ratio d/D, in which d is a radial distance between the axis Z and the end Ev of at least one of the secondary grooves and D is the radial distance between the axis Z and the annular edge, is greater than or equal to 0.65.

4. The bottle as claimed in claim 1, wherein at least one of the main grooves has an inverted "U" general shape in cross section in a plane parallel to the axis Z, and in that the branches of the "U" form between them an angle $\alpha 1$ between 3° and 50° inclusive.

5. The bottle as claimed in claim 1, wherein at least one of the secondary grooves has an inverted "V" general shape in cross section in a plane parallel to the axis Z, and in that the branches of the "V" form between them an angle $\alpha 2$ between 45 and 65° inclusive.

6. The bottle as claimed in claim 1 wherein each arch portion has a substantially rectilinear radial profile.

7. The bottle as claimed in claim 1, wherein each arch portion has a profile forming an angle $\alpha 3$ with the contact plane XY between 5 and 20° inclusive.

8. The bottle as claimed in claim 1, wherein the bottom, the body and/or the neck have a circular shape in cross section in a plane parallel to the contact plane XY.

9. The bottle as claimed in claim 1, wherein its volume capacity in centiliters is 20 to 30 cL, or 30 to 40 cL, or 40 to 60 cL, or 60 to 80 cL, or 80 to 110 cL, or 110 to 130 cL, or 130 to 160 cL, or 160 to 180 cL, or 180 to 220 cL, or 220 to 260 cL.

* * * * *